A. R. LENDNER.
Apparatus for Purifying Water and other Liquids.
No. 225,014.  Patented Mar. 2, 1880.
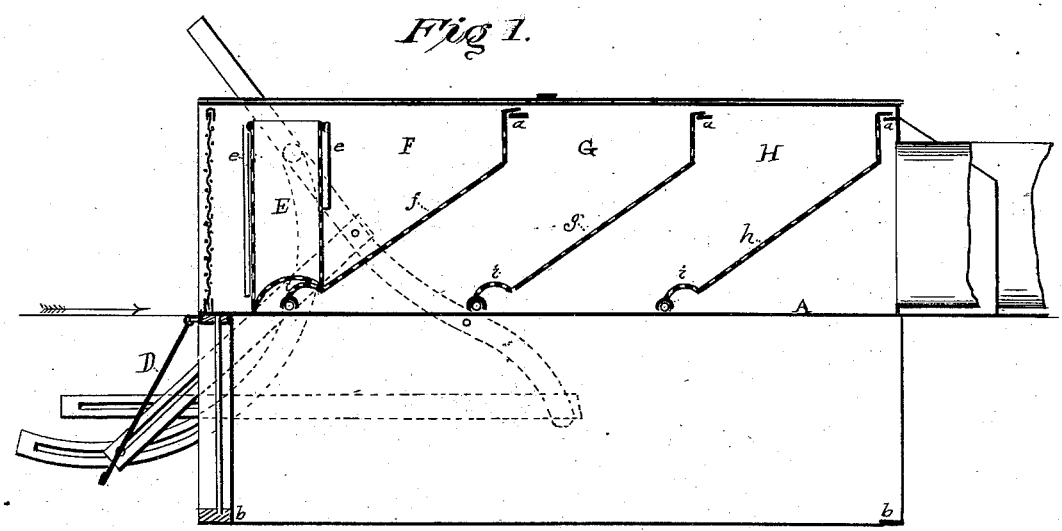
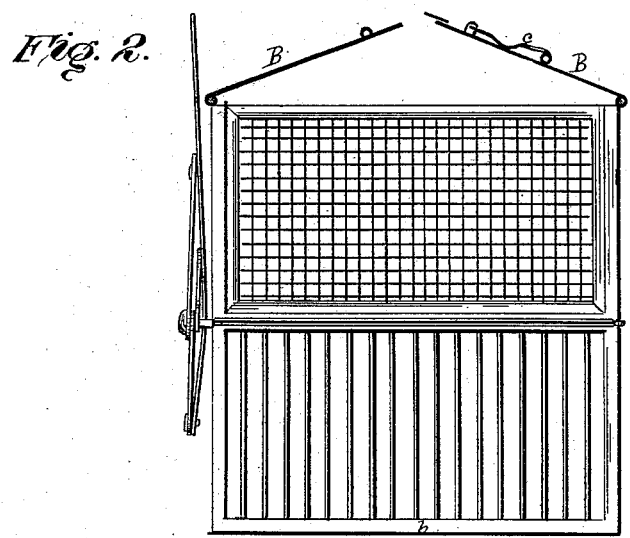
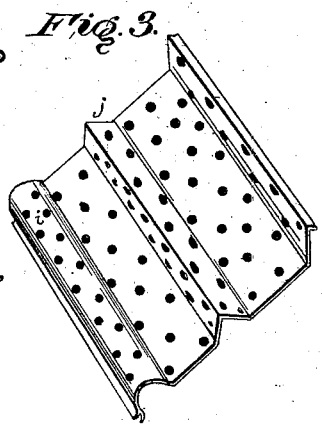
Witnesses:
Fred. G. Dieterich
Charles S. Herron.
Inventor:
A. R. Lendner

UNITED STATES PATENT OFFICE.

AUGUSTUS R. LENDNER, OF WASHINGTON, DISTRICT OF COLUMBIA, ASSIGNOR TO JACOB HEITZ, SR., OF PATTERSON, PA.

APPARATUS FOR PURIFYING WATER AND OTHER LIQUIDS.

SPECIFICATION forming part of Letters Patent No. 225,014, dated March 2, 1880.

Application filed January 14, 1880.

*To all whom it may concern:*

Be it known that I, AUGUSTUS R. LENDNER, of Washington city, in the District of Columbia, have invented certain new and useful Improvements in Purifying Water and other Liquids; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my invention is the purification of mine or other water containing elements which render it unfit for steam or domestic purposes, and for purifying other liquids; and it consists in a suitable case divided by a horizontal partition into two chambers, the upper one of which contains a perforated chest, and also compartments for containing strata of purifying materials, the lower chamber being a wasteway for the escape of surplus water.

Figure 1 is a longitudinal vertical section. Fig. 2 is an end view, and Fig. 3 is a view of a part of my apparatus detached.

The case of my purifier is of rectangular form, and is divided into two chambers, an upper and a lower one, by a horizontal partition, A, as shown in Fig. 1. At the top the sides of the case are connected by braces *a a a*, and at the bottom by braces *b b*. The top of the case is provided with hinged covers B B, which, when closed, are secured by the clasp *c*.

The end of the case at which the water enters is closed by a wire screen or bars, as shown in Fig. 2, and is also provided with a door or trap, D, supported horizontally on hinges at the point where the case is divided into the two chambers. This door is the same size as the end of either chamber, and is for the purpose of regulating the flow of water into or excluding it entirely from either chamber, and is operated by suitable levers. The opposite end of the case is open.

In the upper chamber, near the screen, is placed a removable chest, E, the sides and bottom of which are perforated. The chest is held in place by cleats *e e*. The remaining portion of the upper chamber is divided into compartments F G H by perforated partitions *f g h*. These partitions are removable, their lower ends resting on pivots on the floor of the chamber, and they extend upward and backward toward the open end of the case, and their upper ends rest on the braces *a a a*. The partitions have curves or corrugations extending horizontally from side to side, as shown at *i, i, i*, and *j*, Figs. 1 and 3, the convexity of the corrugations being on their upper surface, and they serve to increase the surface of the partitions, and also to prevent the materials contained in the compartments from settling down on the floor of the chamber.

My purifier is intended to be placed in the bed of a stream of water flowing from a mine, or of a stream the water of which is so largely impregnated with mineral matter, acids, or other impurities as to render it unfit for steam or domestic purposes, the end inclosed by the screen being placed up the stream, and the case packed around by earth or other material, so as to force the water to pass through it in the direction indicated by the arrow.

By means of the door D the entrance to the lower chamber may be partially or entirely closed, so as to force as much water as is desired for use through the upper or purifying chamber, the surplus water, if any, passing through the lower chamber or wasteway. In the same manner the entrance to the upper chamber may be closed by the door, when it is desired to clean said chamber, to protect it from injury from floods, or for any other purpose. The screens serve to arrest the entrance of rubbish into either chamber.

I am aware that ledges and corrugations have been used in filters; but I use corrugations only on the perforated inclined plates which separate the strata of purifying materials for the purpose of increasing their surface, and also to arrest the settling of said materials to the floor of the chamber.

My purifier is charged by filling the chest E with quicklime, the compartment F with charcoal, G with limestone, and H with gravel.

The water first passes through the quicklime, and from thence it percolates through the strata of charcoal, limestone, and gravel successively, by which means the acids contained in it are neutralized, and it is freed from mineral, sulphur, and other matter which render it detrimental for steam and domestic purposes.

The water, after passing through the purifier, may be conveyed through one or more ducts to where it is desired for use.

When it is desired to cleanse the purifier and recharge it with fresh materials, it is easily accomplished by removing the chest E and the partitions $f\ g\ h$, when the whole of the upper chamber will be exposed, and by means of the door D the chamber may be flushed with water to further facilitate the cleansing.

What I claim as my invention, and desire to secure by Letters Patent, is—

1. The door D, in combination with the case divided into two chambers by the partition A, substantially as and for the purposes set forth.

2. The chest E, in combination with the plates $f\ g\ h$, substantially as and for the purpose set forth.

3. The plates $f\ g\ h$, constructed with the corrugations $i$ and $j$, substantially as shown and described.

4. In a purifier having two chambers, as decribed, the door D, chest E, and partitions $f\ g\ h$, the whole constructed, arranged, and operating substantially as shown, and for the purposes set forth.

In testimony that I claim the foregoing I have hereunto set my hand this 13th day of January, 1880.

AUGUSTUS R. LENDNER.

Witnesses:
 CHAS. S. HERRON,
 JOS. F. HODGSON.